US010697843B2

United States Patent
Safah

(10) Patent No.: US 10,697,843 B2
(45) Date of Patent: Jun. 30, 2020

(54) SYSTEM AND METHOD FOR MEASURING THRUST OF A PROPELLER

(71) Applicant: PRATT & WHITNEY CANADA CORP., Longueuil (CA)

(72) Inventor: Fadi Safah, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 37 days.

(21) Appl. No.: 16/151,497

(22) Filed: Oct. 4, 2018

(65) Prior Publication Data

US 2020/0109997 A1 Apr. 9, 2020

(51) Int. Cl.
| | | |
|---|---|---|
| G01L 5/00 | (2006.01) |
| G01L 5/13 | (2006.01) |
| G01L 5/12 | (2006.01) |
| B64D 27/10 | (2006.01) |

(52) U.S. Cl.
CPC ............ *G01L 5/133* (2013.01); *G01L 5/0019* (2013.01); *G01L 5/12* (2013.01); *B64D 27/10* (2013.01); *F05D 2270/808* (2013.01)

(58) Field of Classification Search
CPC ......... G01L 5/133; G01L 5/0019; G01L 5/12; B64D 27/10; F05D 2270/808
USPC ...................................................... 73/862.49
See application file for complete search history.

(56) References Cited

U.S. PATENT DOCUMENTS

| | | | | |
|---|---|---|---|---|
| 5,527,194 A | * | 6/1996 | Strong | B63H 20/00 440/80 |
| 6,176,074 B1 | * | 1/2001 | Thompson | F01D 21/045 60/39.091 |
| 7,707,902 B2 | | 5/2010 | Haaser et al. | |
| 2012/0291426 A1 | * | 11/2012 | Loison | B64D 13/06 60/327 |
| 2015/0134270 A1 | | 5/2015 | Long et al. | |
| 2017/0335710 A1 | * | 11/2017 | Klemen | H02P 9/04 |
| 2019/0170068 A1 | * | 6/2019 | Darby | F02C 9/28 |

\* cited by examiner

*Primary Examiner* — Max H Noori
(74) *Attorney, Agent, or Firm* — Norton Rose Fulbright Canada LLP

(57) ABSTRACT

An aircraft powerplant and a method for measuring thrust are described herein. A gas turbine engine has a turbine section for extracting energy from combustion gases and has a shaft mounted to the turbine section for converting the energy into rotary motion. A load cell is coupled to an end of the shaft and positioned to rotate with the shaft. The load cell is configured for generating a measurement indicative of propeller thrust. A propeller is coupled to the load cell and is configured for converting the rotary motion from the shaft and the load cell into the propeller thrust. The propeller thrust can be measured from the load cell as the propeller rotates.

17 Claims, 8 Drawing Sheets

SYSTEM AND METHOD FOR MEASURING THRUST OF A PROPELLER

TECHNICAL FIELD

The present disclosure relates generally to aircraft engines, and, more particularly, to measuring thrust of aircraft engines.

BACKGROUND OF THE ART

For propeller driven aircraft, the powerplant consists of two principal and distinct components: a gas turbine engine and a propeller. The gas turbine engine turns the propeller to generate thrust.

Thrust is difficult to measure directly as non-thrust contributors may be present on the propeller. For this reason, thrust of a propeller may be estimated. Such estimates are less accurate than actual measurements.

There is therefore room for improvement.

SUMMARY

In one aspect, there is provided an aircraft powerplant. The aircraft powerplant comprises: a gas turbine engine having a turbine section for extracting energy from combustion gases, and having a shaft mounted to the turbine section for converting the energy into rotary motion; a load cell coupled to an end of the shaft and positioned to rotate with the shaft, the load cell configured for generating a measurement indicative of propeller thrust; and a propeller coupled to the load cell and configured for converting the rotary motion from the shaft and the load cell into the propeller thrust.

In another aspect, there is provided a method for measuring propeller thrust. The method comprises: extracting energy from combustion gas in a gas turbine engine using a turbine section of the gas turbine engine; converting the energy into rotary motion via a shaft mounted to the turbine section; transferring the rotary motion to a propeller through a load cell coupled between the shaft and the propeller, the propeller configured for converting the rotary motion into propeller thrust; and measuring the propeller thrust from the load cell as the propeller rotates.

DESCRIPTION OF THE DRAWINGS

Reference is now made to the accompanying figures in which.

It will be noted that throughout the appended drawings, like features are identified by like reference numerals. It is further noted that the figures are not necessarily to scale.

DETAILED DESCRIPTION

Figure 1:
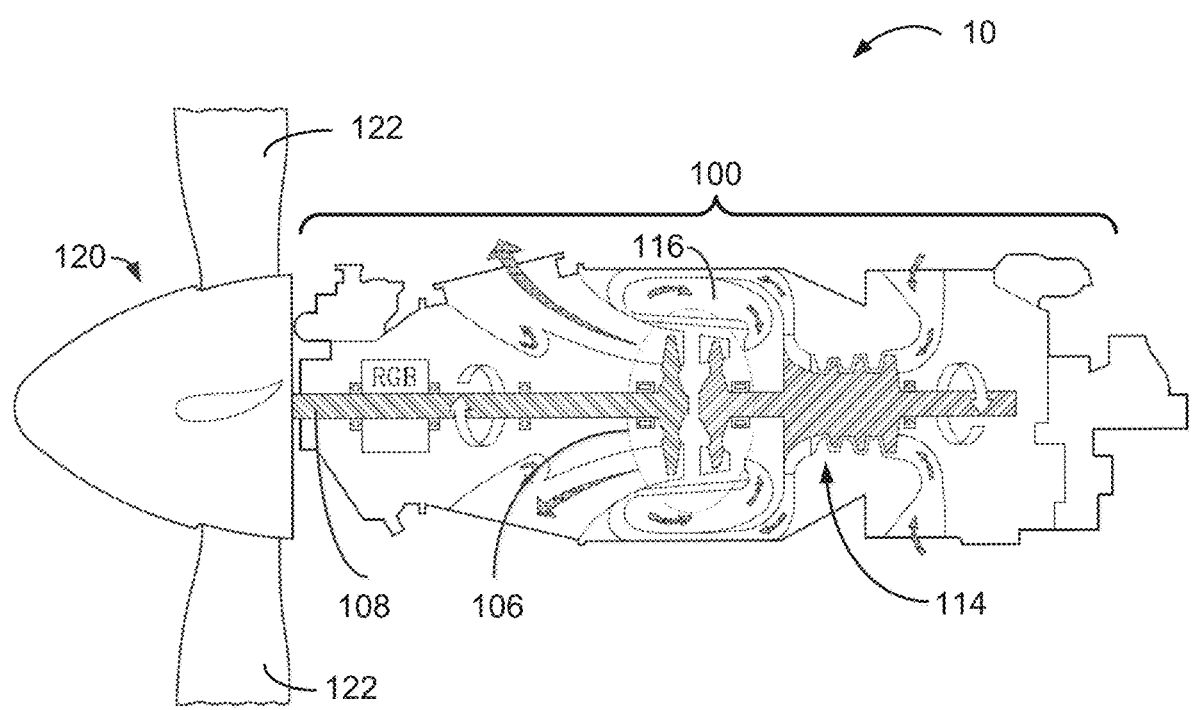
FIG. 1 is a schematic cross-sectional view of an example aircraft powerplant.

FIG. 1 illustrates an aircraft powerplant 10 for an aircraft of a type preferably provided for use in subsonic flight, generally comprising an engine 100 and a propeller 120. The powerplant 10 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from the shaft 108 of the engine 110 to provide propulsive force for the aircraft, also known as thrust. The propeller 120 comprises two or more propeller blades 122. A blade angle of the propeller blades 122 may be adjusted. The blade angle may be referred to as a beta angle, an angle of attack or a blade pitch. The powerplant 10 may be implemented to comprise a single or multi-spool gas turbine engine with a free turbine or boosted architecture, where the turbine section 106 is connected to the propeller 120 through a reduction gearbox (RGB).

Figure 2:
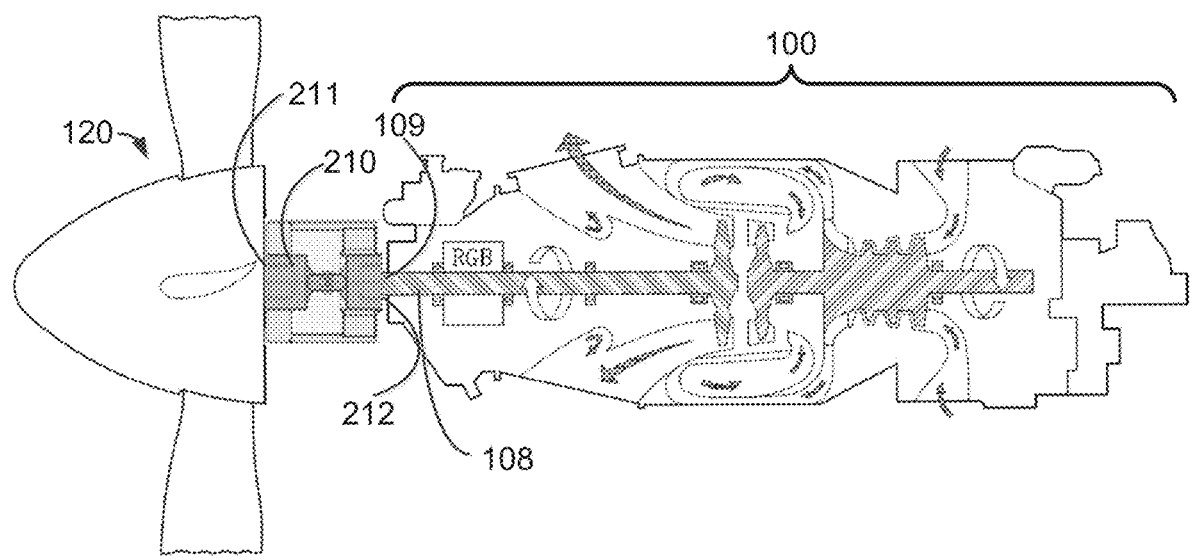
FIG. 2 is a schematic diagram illustrating a load cell coupled to the powerplant of FIG. 1, in accordance with an embodiment.

With reference to FIG. 2, there is a shown a load cell 210 coupled to the engine 100 and the propeller 120 of FIG. 1, for measuring thrust of the propeller 120 (hereinafter "propeller thrust"). The load cell 210 has a first end 211 coupled to the propeller 120 and second end 212 couple to an end 109 of the engine shaft 108. The load cell 210 is positioned to rotate with the shaft and provides the rotary motion from the engine shaft 108 to the propeller 120 when the engine shaft 108 is rotating. The propeller is configured to convert the rotary motion from the engine shaft 108 and the load cell 210 into propeller thrust. Accordingly, the load cell 210 is configured to generate at least one measurement of a load that is indicative of propeller thrust. The load cell 210 may be implemented as any suitable transducer that generates at least one electrical signal having a magnitude that is directly proportional to a load being measured. In order for the load to be indicative of propeller thrust, the measurement should represent the load on the entire shaft 108.

While the load cell 210 is described herein with reference to the engine 100 and the propeller 120 of FIG. 1 for measuring propeller thrust, this is for example purposes. The load cell 210 may be used with any other suitable engine and/or other suitable propeller. It should be appreciated that load cell 210 may be installed in the powerplant 10 without modifying the engine 100 and propeller 120 of the powerplant 10.

Figure 3:
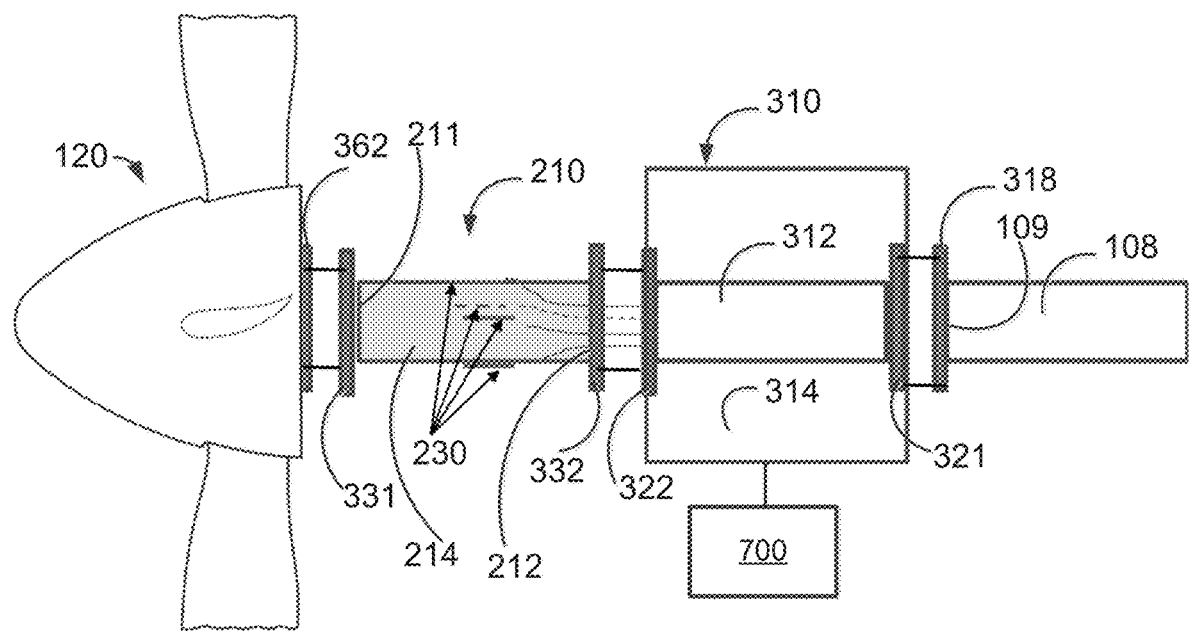
FIG. 3 is a schematic diagram illustrating a rotating electrical connector coupled to the load cell of FIG. 2, in accordance with an embodiment.

With additional reference to FIG. 3, the load cell 210 may be coupled to a rotating electrical connector 310. The rotating electrical connector 310 allows the load cell 210 to be connected to a computing device 700, for determining propeller thrust based on the measurement. In some embodiments, the computer device 700 is separate from an aircraft computer and an engine computer. In some embodiments, the computing device 700 is an engine computer that is communicatively connected to an aircraft computer. In some embodiments, the computing device 700 is an aircraft computer that is operatively connected to the engine computer.

The computing device 700 may output the propeller thrust to a display device, for example for testing purposes.

The rotating electrical connector 310 may be any suitable electromechanical device that allows for the transmission of electrical signals from a rotating portion 312 of the rotating electrical connector 310 to a stationary portion 314 of the rotating electrical connector 310. In accordance with an embodiment, the measurement of the load on the load cell 210 comprises at least one measurement signal. One or more wires from the load cell 210 may provide the measurement signal to the rotating portion 312. The stationary portion 314 may obtain the measurement signal from the rotating portion 312 and provide the measurement signal to the computing device 700 via one or more wires. The rotating electrical connector 310 may be a "slip ring", as sometimes referred to in the art.

In some embodiments, and as illustrated in FIG. 3, the rotating electrical connector 310 is provided between the load cell 210 and the engine shaft 108. Flange 321 of the rotating electrical connector 310 is connected to flange 318 of the engine shaft 108 and flange 322 of the rotating electrical connector 310 is connected to flange 332 of the load cell 210. Flange 331 of the load cell is connected to flange 362 of the propeller 120. Flanges 331 and 362 may be configured to match in size and/or shape. Flanges 332 and 322 may be configured to match in size and/or in shape. Flanges 321 and 318 may be configured to match in size and/or in shape. The rotating electrical connector 310 may be connected to the load cell 210 in any other suitable manner.

In some embodiments, the rotating electrical connector 310 is positioned between the propeller 120 and the load cell 210. For example, flange 321 of the rotating electrical connector 310 may be connected to flange 331 of the load cell 210, flange 322 of the rotating electrical connector 310 may be connected to flange 362 of the propeller 120, and flange 318 of the shaft may be connected to flange 332 of the load cell 210.

In some embodiments, the rotating electrical connector 310 is omitted and the measurement is provided to the computing device 700 by another suitable manner. For example, a wireless transmitter communicatively coupled to the load cell 210 may be used to provide the measurement to a wireless receiver of the computing device 700. Accordingly, flange 331 of the load cell 210 may be coupled to flange 362 of the propeller and flange 332 of the load cell 210 may be coupled to flange 318 of the engine.

In accordance with an embodiment, the load cell 210 comprises one or more strain gauges 230 positioned about a body 214 of the load cell 210, which may be referred to as a strain gauge bridge. The body 214 may be any suitable structural member that deforms when a force is applied thereto. The body 214 may be of a cylindrical shape, and in such cases may be referred to as a cylindrical body. Each of the strain gauges 230 may deform when the material of the load cell 210 deforms. The strain gauges 230 provide measurements of the load on the load cell 210 at different locations of the body 214, as certain portions of the body 214 may undergo compression and other portions may undergo tension. The deformation of a given strain gauge 230 changes the electrical resistance of that strain gauge 230 by an amount that is proportional to the strain on that strain gauge 230. For example, when a given strain gauge 230 is under tension the resistance increases, and when a given strain gauge 230 is under compression the resistance decreases. Each of the strain gauges 230 may provide a measurement of the strain on that strain gauge 230 which is indicative of the load on the load cell 210 at the given location of that strain gauge 230. In accordance with an embodiment, the measurement provided by the load cell 210 comprises one or more measurement signals from the one or more strain gauges 230. The measurement signal from a given strain gauge 230 may be a voltage signal that is indicative of the resistance of a given strain gauge 230. The measurement signals of each strain gauge 230 may be provided to the computing device 700 and may be used to determine the load on the load cell 210 at the different locations of the body 214. The propeller thrust may accordingly be determined from the average of the measurement signals.

The load cell 210 may be calibrated such that an output voltage from a given strain gauge 230 is known in relation to a load applied to the load cell 210. For example, known loads may be applied on the load cell 210 in a test environment (e.g., in a laboratory) and voltage output from each of the strain gauges 230 may be measured and recorded. This calibration process may take place without attaching the load cell 210 to the engine 100 and the propeller 120.

Figure 4:
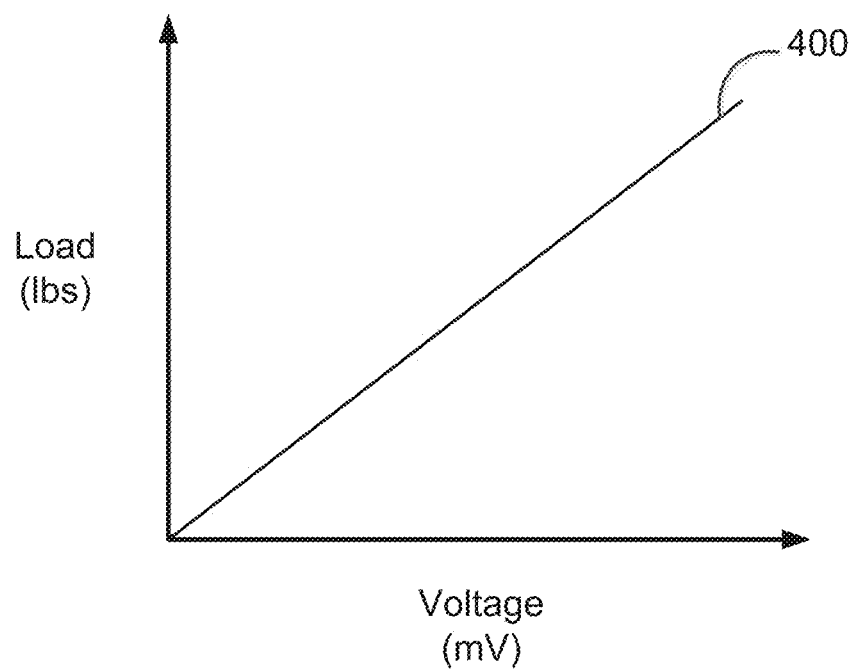
FIG. 4 is a curve illustrating a relationship between known load on a strain gauge and measured output voltage from the strain gauge, in accordance with an embodiment.

FIG. 4 illustrates an example of a calibration curve 400 for voltage versus load that may be determined in the test environment by applying known loads and recording the output voltage from a given strain gauge 230. Accordingly, the predetermined calibration curve 400 may be used to determine a load from a voltage signal from a given strain gauge 230. In some embodiments, each of the strain gauges 230 has a corresponding calibration curve and a voltage level obtained from a voltage signal from a given strain gauge may be compared to the calibration curve to obtain a corresponding load. In other embodiments, a single calibration curve is used where the calibration curve is generated based on an average of the voltage signals from the strain gauges 230. Accordingly, the average of the voltage signals from the strain gauges 230 may be compared to the calibration curve to obtain the load on the load cell 210. Any other suitable technique may be used to determine the load on the load cell 210 from the measurement signals, such as, for example an equation, a function, or a look-up table.

Figure 5A:
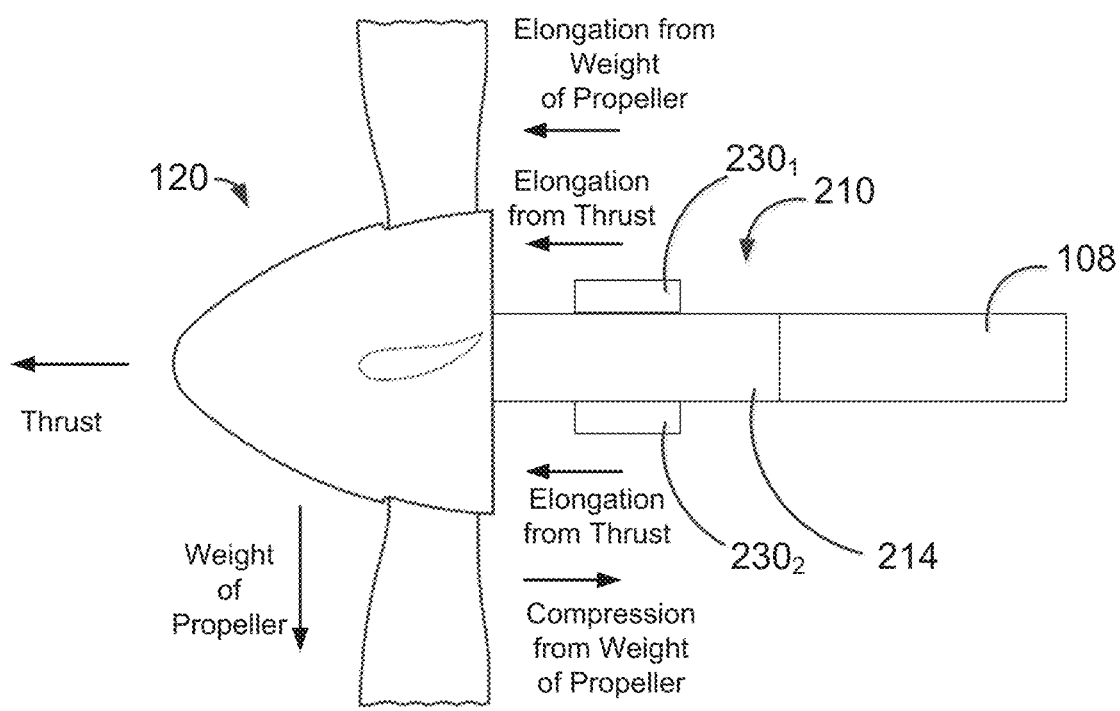
FIG. 5A is a schematic diagram illustrating loads on a load cell, in accordance with an embodiment.

Referring to FIG. 5A, in some embodiments, the load cell 210 comprises two (2) strain gauges $230_1$, $230_2$ coupled to the cylindrical body 214 of the load cell 210, which may be referred to as a half-bridge load cell. In this embodiment, the strain gauges $230_1$, $230_2$ are positioned substantially equidistant from each other around a circumference of the cylindrical body 214. As illustrated, when the first strain gauge $230_1$ is positioned at the top of the body 214 (when viewed laterally), the first strain gauge $230_1$ is elongated from the weight of the propeller 120. When the second strain gauge $230_2$ is positioned at the bottom of the body 214, the second strain gauge $230_2$ is compressed from the weight of the propeller 120. Both of the strain gauges $230_1$, $230_2$ are elongated by the propeller thrust. Accordingly, by averaging the load measurements from the strain gauges $230_1$, $230_2$, the contribution from the propeller weight is eliminated and the propeller thrust may be directly measured.

The example described in relation to FIG. 5A is a simplified example, as it does not consider any aerodynamic load on the propeller 120. A 1P moment corresponding to a load on the propeller 120 from an incoming airstream may be present on the engine shaft 108. In other words, the propeller 120, when at incidence to the incoming airstream, may generate in-plane static loads on the engine shaft 108, which is commonly referred to as a 1P moment. Similar to the example described in relation to FIG. 5A, by having a plurality of strain gauges 230 positioned substantially equidistant from each other around a circumference of the cylindrical body 214 of the load cell 210 and by averaging the measurements from the plurality of strain gauges 230, the non-thrust contributors, such as the 1P moment, the weight of the propeller 120 and/or any other bending moment on the engine shaft 108, are eliminated. Accordingly, the propeller thrust may be directly measured by averaging the measurements from the plurality of strain gauges 230, as the non-thrust contributors are eliminated.

Figure 5B:
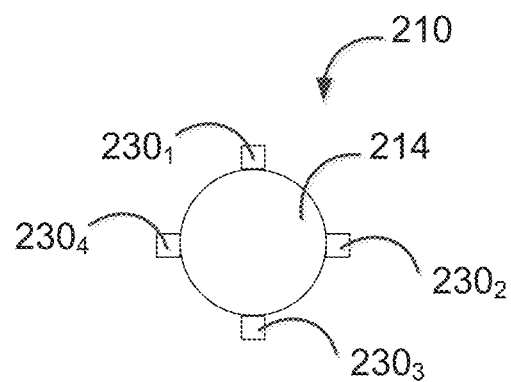
FIG. 5B is a cross-sectional view of a load cell comprising strain gauges, in accordance with an embodiment.

Referring to FIG. 5B, in some embodiments, the load cell 210 comprises four (4) strain gauges $230_1$, $230_2$, $230_3$ and $230_4$ coupled to the cylindrical body 214 of the load cell 210, which may be referred to as a full-bridge load cell. The strain gauges $230_1$, $230_2$, $230_3$ and $230_4$ may be positioned substantially equidistant from each other around the circumference of the cylindrical body 214. For instance, the strain gauges $230_1$, $230_2$, $230_3$ and $230_4$ may be positioned at 12, 3, 6 and 9 o'clock positions. An average of the measurement signals from each of the strain gauges $230_1$, $230_2$, $230_3$ and $230_4$ may be determined. The average of the measurement signals may then be compared to the calibration curve 400 to determine the load on the load cell 210 caused by thrust.

In some embodiments, the load cell 210 is configured for generating a measurement indicative of the 1P moment. The load cell 210 may be used to measure the 1P moment with or without measuring propeller thrust. Accordingly, the computing device 700 may be configured to receive the measurement indicative of the 1P moment and for determining the 1P moment based on the measurement.

The implementation of the load cell 210 may vary depending on whether propeller thrust and/or the 1P moment are to be measured. Accordingly, the number of strain gauges may vary and may be more or less than four (4) strain gauges $230_1$, $230_2$, $230_3$ and $230_4$. For example, an individual reading from a single strain gauge 230 may be indicative of a bending strain and may be used to determine the 1P moment. The 1P moment may also be referred to as a manoeuvre load. The manoeuvre load causes a bending load on the shaft 108 which could be in any of the axes in the plane of the propeller.

The 1P moment may be determined from the individual measurement of any one of the strain gauges 230. In some embodiments, measurements from any one of strain gauges $230_1$, $230_2$, $230_3$ and $230_4$ are selected and used to measure the bending load on the shaft 108. The voltage level obtained in the measurement from the selected strain gauge is mapped on a calibration curve of voltage versus load. The load on the curve that corresponds to the measured voltage is the 1P moment.

Figure 6:
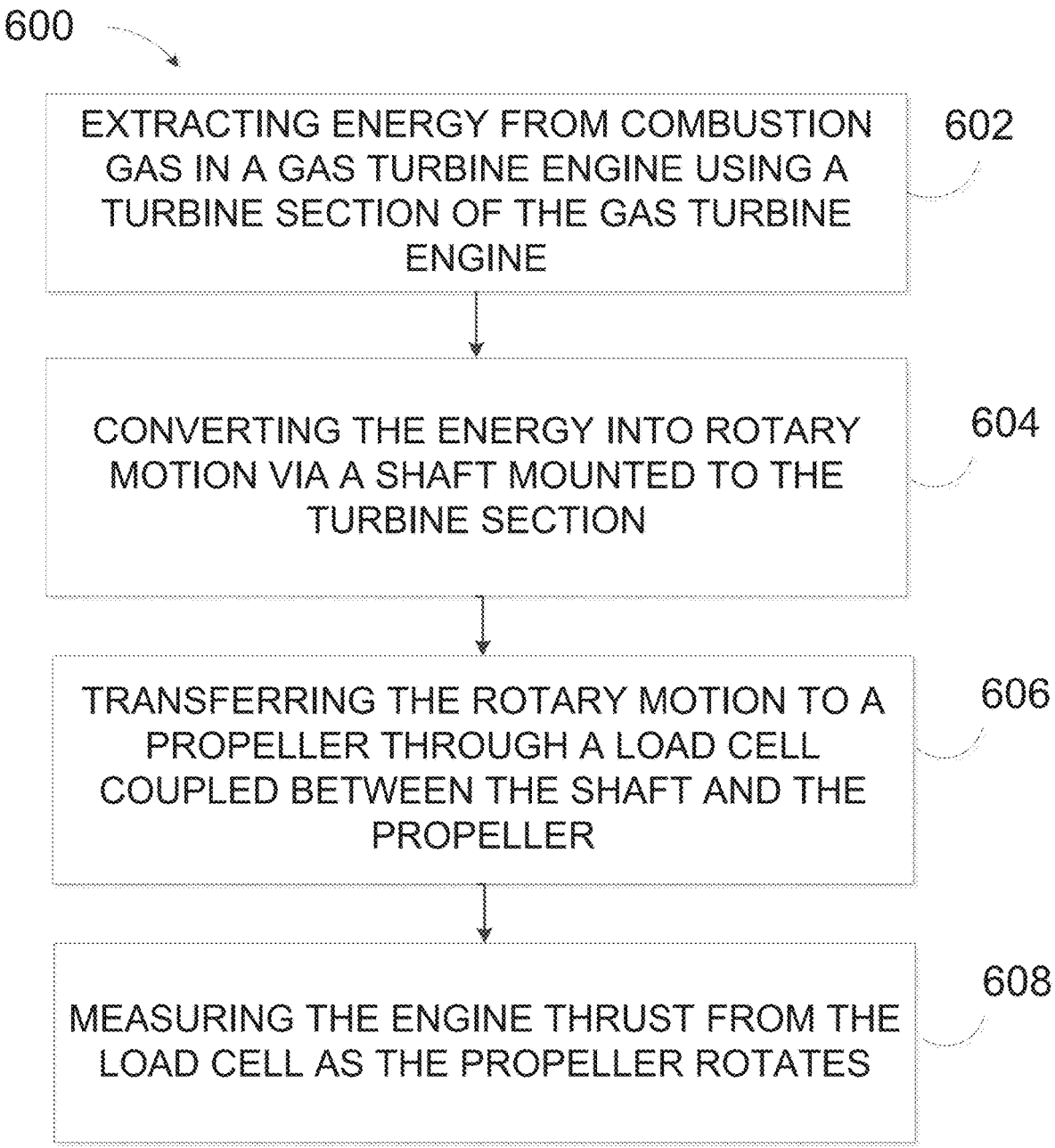
FIG. 6 is a flow chart of a method for measuring thrust, in accordance with an embodiment.

With reference to FIG. 6, there is shown a flowchart illustrating an example method 600 for measuring propeller thrust. While the method 600 is described herein with reference to the load cell 210 coupled to the engine 100 and the propeller 120, this is for example purposes. The method 600 may be applied to any other suitable engine and/or other suitable propeller. At step 602, energy from the combustion gas in the gas turbine engine 100 is extracted using the turbine section 106 of the engine 100. As indicated above with reference to FIG. 1, the combustion gases are generated when compressed air is mixed with fuel and ignited, for example in the combustor 116 of the engine 100. Air is pressurized in compressor section 114 before being mixed with fuel and ignited in the combustor.

At step 604, the energy extracted by the turbine section 106 of the engine 100 is converted into rotary motion via the shaft 108 mounted to the turbine section 106. At step 606, the rotary motion is transferred to the propeller 120 through the load cell 210 coupled between the shaft 108 and the propeller 120. The propeller 120 is configured to convert the rotary motion into propeller thrust. At step 608, propeller thrust is measured from the load cell 210 as the propeller 120 rotates. Propeller thrust may be continuously received, e.g. in real time, and/or may be received in accordance with any suitable regular or irregular time interval.

In some embodiments, measuring the propeller thrust comprises receiving a measurement from the load cell 210 at computing device 700. The measurement may be processed by the computing device 700 to determine the propeller thrust. In some embodiments, measuring the propeller thrust comprises receiving a plurality of measurement signals from the plurality of strain gauges 230 positioned substantially equidistant from each other around a circumference of the body 214 of the load cell 210. In some embodiments, measuring propeller thrust comprises averaging the plurality of measurement signals from the plurality of strain gauges 230. In some embodiments, measuring the propeller thrust comprises obtaining the thrust from the predetermined calibration curve 400 based on the plurality of measurement signals from the plurality of strain gauges 230.

In some embodiments, the method 600 further comprises measuring the 1P moment of the propeller 120 from the load cell 2210 as the propeller 120 rotates. The propeller thrust and/or the 1P moment may be output to a display device, an aircraft and/or an engine computer. The aircraft computer may provide the propeller thrust and/or the 1P moment to a display device for displaying the aforementioned to a pilot or other crew member of an aircraft.

In some embodiments, the method 600 may accordingly be modified to measure the 1P moment with or without measuring propeller thrust. Indeed, 1P moment may be measured using the load cell 210 coupled between the propeller 120 and the engine 100 using an individual strain gauge measurement. In this case, step 608 would be modified to measure 1P moment from the load cell as the propeller rotates. Steps 602, 604 and 606 would remain as is.

In some embodiments, calibration of the load cell 210 may be performed without having the load cell 210 coupled to the engine 100 and the propeller 120 and/or without the powerplant 10 being coupled to an aircraft. A known load can be applied directly to the load cell 210 and the output of the load cell 210 may be recorded. A calibration curve may also be derived for a load cell coupled to a powerplant attached to an aircraft. A known load is applied to the propeller and measurements from the load cell 210 are recorded. This may be done by attaching a cable to one end of the propeller, attaching weights to the cable, and using a pulley to hold the cable in order to suspend the weights. However, as the pulley, the cable, and the attachment of the cable to the propeller add additional factors, the measured output of the load cell 210 may differ from the case where the known load is applied directly to the load cell.

Figure 7:
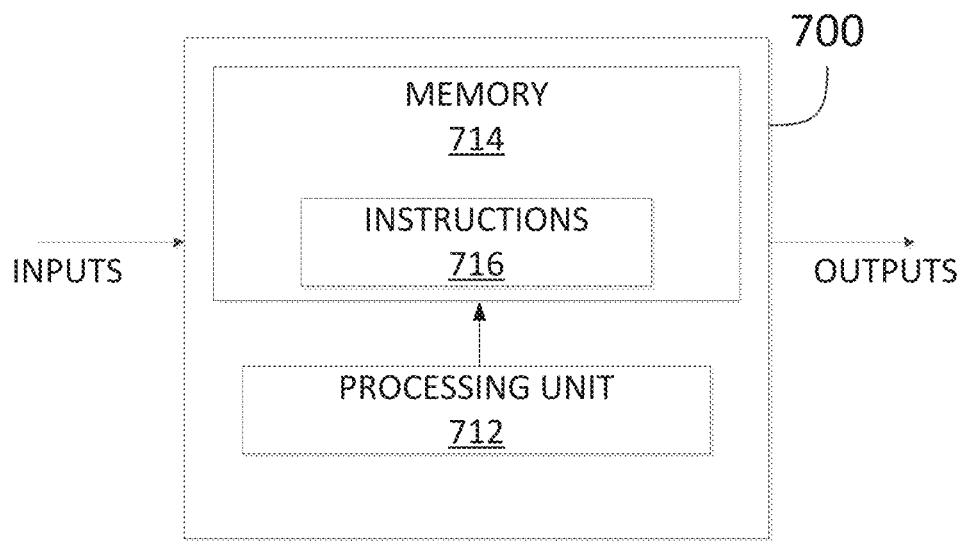
FIG. 7 is a block diagram of an example computing device for implementing the method of FIG. 6, in accordance with an embodiment.

With reference to FIG. 7, the method 600 may be implemented using the computing device 700 comprising a processing unit 712 and a memory 714 which has stored therein computer-executable instructions 716. The processing unit 712 may comprise any suitable devices configured to implement the system such that instructions 716, when executed by the computing device 700 or other programmable apparatus, may cause the functions/acts/steps of the method 600 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. In some embodiments, the computing device 700 can be implemented as part of a full-authority digital engine controls (FADEC) or other similar device, including electronic engine control (EEC), engine control unit (ECU), and the like.

The methods and systems for measuring thrust described herein may be implemented in a high level procedural or object oriented programming or scripting language, or a combination thereof, to communicate with or assist in the operation of a computer system, for example the computing device 700. Alternatively, the methods and systems for measuring thrust may be implemented in assembly or machine language. The language may be a compiled or interpreted language. Program code for implementing the methods and systems for measuring thrust may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for measuring thrust may also be considered to be implemented by way of a non-transitory computer-readable storage medium having a computer program stored thereon. The computer program may comprise computer-readable instructions which cause a computer, or in some embodiments the processing unit 712 of the computing device 700, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

While the aircraft powerplant 10 described herein is a turoprop powerplant, the load cell 210 may be used in a turboshaft, turbofan and/or turbojet powerplant. Depending on the type of powerplant, the load cell 210 could be installed at a rotor flange, a fan mounting flange, an engine mounting ring and/or a test cell skid. For example, for a turbofan powerplant, the load cell 210 may be coupled between a fan and an engine shaft. By way of another example, for a turboshaft powerplant, load cell 210 may be coupled upstream of a helicopter rotor. For a turbojet powerplant, the load cell 210 may be coupled at a mounting ring in a nacelle. Accordingly, the load cell 210 can be used to measure the thrust load generated by the propeller, rotor or hot gas jet and/or the bending moment generated from aircraft manoeuvers.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the aircraft powerplant and the methods and systems for measuring thrust may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. An aircraft powerplant, comprising:
a gas turbine engine having a turbine section for extracting energy from combustion gases, and having a shaft mounted to the turbine section for converting the energy into rotary motion;
a load cell coupled to an end of the shaft and positioned to rotate with the shaft, the load cell configured for generating a measurement indicative of propeller thrust; and
a propeller coupled to the load cell and configured for converting the rotary motion from the shaft and the load cell into the propeller thrust.

2. The aircraft powerplant of claim 1, further comprising a computing device communicatively coupled to the load cell and configured for receiving the measurement and determining the propeller thrust based on the measurement.

3. The aircraft powerplant of claim 1, further comprising a rotating electrical connector communicatively coupled between the load cell and the computing device.

4. The aircraft powerplant of claim 3, wherein the rotating electrical connector is connected between the load cell and the shaft.

5. The aircraft powerplant of claim 3, wherein the rotating electrical connector is connected between the load cell and the propeller.

6. The aircraft powerplant of claim 2, wherein the load cell comprises a body and a plurality of strain gauges positioned substantially equidistantly around a circumference of the body.

7. The aircraft powerplant of claim 6, wherein the computing device is configured for determining the propeller thrust based on an average of measurements from the strain gauges.

8. The aircraft powerplant of claim 6, wherein the computing device is configured for determining the propeller thrust based on a calibration curve of voltage versus load.

9. The aircraft powerplant of claim 2, wherein the computing device is further configured for determining a 1P moment of the propeller based on the measurement.

10. A method for measuring propeller thrust, the method comprising:
   extracting energy from combustion gas in a gas turbine engine using a turbine section of the gas turbine engine;
   converting the energy into rotary motion via a shaft mounted to the turbine section;
   transferring the rotary motion to a propeller through a load cell coupled between the shaft and the propeller, the propeller configured for converting the rotary motion into propeller thrust; and
   measuring the propeller thrust from the load cell as the propeller rotates.

11. The method of claim 10, wherein measuring the propeller thrust comprises:
   transmitting a measurement indicative of thrust from the load cell to a computing device; and
   determining the propeller thrust in the computing device based on the measurement.

12. The method of claim 11, wherein transmitting the measurement indicative of thrust from the load cell to the computing device comprises transmitting the measurement through a rotating electrical connector coupled between the load cell and the computing device.

13. The method of claim 11, wherein transmitting a measurement indicative of thrust comprises transmitting measurements from a plurality of strain gauges positioned substantially equidistantly around a circumference of a body of the load cell.

14. The method of claim 13, wherein measuring the propeller thrust comprises averaging the measurements from the strain gauges.

15. The method of claim 13, wherein measuring the propeller thrust comprises determining the propeller thrust based on a calibration curve of voltage versus load associated with the strain gauges.

16. The method of claim 10, further comprising measuring a 1P moment of the propeller from the load cell as the propeller rotates.

17. The method of claim 16, wherein measuring a 1P moment comprises:
   transmitting a measurement indicative of 1P moment from the load cell to a computing device; and
   determining the 1P moment in the computing device based on the measurement indicative of 1P moment.

* * * * *